United States Patent [19]

Sussman

[11] Patent Number: 5,369,440
[45] Date of Patent: Nov. 29, 1994

[54] SYSTEM AND METHOD FOR AUTOMATICALLY CONTROLLING THE AUDIO OUTPUT OF A TELEVISION

[76] Inventor: Barry Sussman, 70 Kosmas St., Marlboro, Mass. 01752

[21] Appl. No.: 978,728

[22] Filed: Nov. 19, 1992

[51] Int. Cl.⁵ ............................................. H04N 5/60
[52] U.S. Cl. ................... 348/462; 348/632; 381/43
[58] Field of Search .................. 381/41, 43, 45, 42, 381/44; 358/198, 165, 194.1, 903, 908; 348/738, 632, 734, 462; H04N 3/24, 5/60

[56] References Cited

U.S. PATENT DOCUMENTS

| | | | |
|---|---|---|---|
| 4,302,837 | 11/1981 | Tanaka et al. | 348/632 |
| 4,305,101 | 12/1981 | Yarbrough et al. | 358/908 |
| 4,605,964 | 8/1986 | Chard | 358/165 |
| 4,811,399 | 3/1989 | Landell et al. | 381/43 |
| 5,086,298 | 2/1992 | Katsu et al. | 358/194.1 |
| 5,123,049 | 6/1992 | Koyama | 381/41 |
| 5,199,077 | 3/1993 | Wilcox et al. | 381/42 |
| 5,230,023 | 7/1993 | Nakano | 381/43 |
| 5,253,066 | 10/1993 | Vogel | 348/734 |

Primary Examiner—James J. Groody
Assistant Examiner—Jeffrey S. Murrell
Attorney, Agent, or Firm—Kriegsman & Kriegsman

[57] ABSTRACT

A system and method for automatically controlling the audio output from a television so as to avoid listening to undesired material includes a microphone for converting the audio output from the television into audio signals, an audio amplifier for amplifying the audio signals from the microphone, a waveform pattern comparator, a waveform digitizer and recorder, a speech recognition unit, an external device controller, a computer and an input/output device. In setting up the system for subsequent use, waveform patterns of audio signals corresponding to material being outputted from the television which the listener considers undesirable are digitized by the waveform digitizer and recorder and then stored in the waveform pattern comparator. In addition, digital signals corresponding to key words in undesired material are entered into the computer through the input/output device and then transferred from the computer to the speech recognition unit. Once the system has been loaded with the undesired material, waveform pattern comparator continually digitizes and compares the audio signal output from the audio amplifier with the stored data. At the same time, the speech recognition unit compares the audio signal output with the stored key words. When the undesired material is detected an indicator signal is sent to the external device controller which outputs a control signal which is applied to the television to make some adjustment to either the sound or the channel to avoid listening to the undesired material.

10 Claims, 2 Drawing Sheets

SYSTEM AND METHOD FOR AUTOMATICALLY CONTROLLING THE AUDIO OUTPUT OF A TELEVISION

BACKGROUND OF THE INVENTION

The present invention relates generally to a system and method for automatically controlling the audio output of a television and more particularly to a system and method for automatically controlling the audio output of a television so as to avoid listening to material previously determined to be undesirable.

Very often, a person does not wish to listen to certain materials being outputted from a television. The particular materials may be for example, commercials or offensive language or any other material not to the liking of the particular listener. One way to avoid hearing such material is to manually mute or turn down the volume of the sound being outputted from the television. Another way is to manually change the channel to which the television is set. Still another way is to manually turn off the television. As can be appreciated, none of these arrangements are entirely satisfactory.

Accordingly, it is an object of this invention to provide a new and novel method and system for controlling the audio output of television so as to avoid listening to undesired materials.

It is another object of this invention to provide a system and method as described above which is fully automatic.

It is still another object of this invention to provide a method and system as described above in which the specified content of the undesired materials can be easily and continually changed.

SUMMARY OF THE INVENTION

A method of automatically controlling the audio output of a television so as to avoid listening to undesired material according to this invention comprises the steps of generating a set of digital signals unique to the undesired program material, storing said set of digital signals so generated, converting the audio output of the television to digital signals as it is being transmitted from the television, comparing the digital signals corresponding to the audio output from the television to the stored set of digital signals to determine the presence of the undesired material in the audio output, generating an indicator signal as soon as the undesired material is detected, generating a control signal in response to the indicator signal, and then applying the control signal to the television so as to control the audio output of the television.

A system for automatically controlling the audio output of a television so as to avoid listening to undesired material constructed according to this invention comprises means for generating a set of digital signals unique to the undesired program material, means for storing said set of digital signals, means for comparing the stored set of digital signals so generated with digital signals corresponding to the audio output being transmitted from the television to detect the presence of undesired material in the audio output and producing an indicator signal when the undesired material is detected, means for receiving the indicator signal and producing a control signal in response thereto for controlling the audio output to the television and a computer for controlling the operations of the device.

Various features and advantages will appear from the description to follow. In the description, reference is made to the accompanying drawings which form a part thereof, and in which is shown by way of illustration, specfic embodiments for practicing the invention. These embodiments will be described in sufficient detail to enable those skilled in the art to practice the invention, and it is to be understood that other embodiments may be utilized and that structrual changes and implementations may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENTS

The present invention is directed to a technique for controlling the audio output transmitted from a television to avoid listening to material such as commericals or offensive language which the listener has previously determined he does not wish to hear. The technique involves storing information unique to the undesired program material, then, comparing the audio output from the television with the stored information to determine if the undesired program material is being outputted from the television and then as soon as the undesired material is detected generating a control signal for automatically changing the output of the television in some way so that such material is not outputted.

Figure 1:
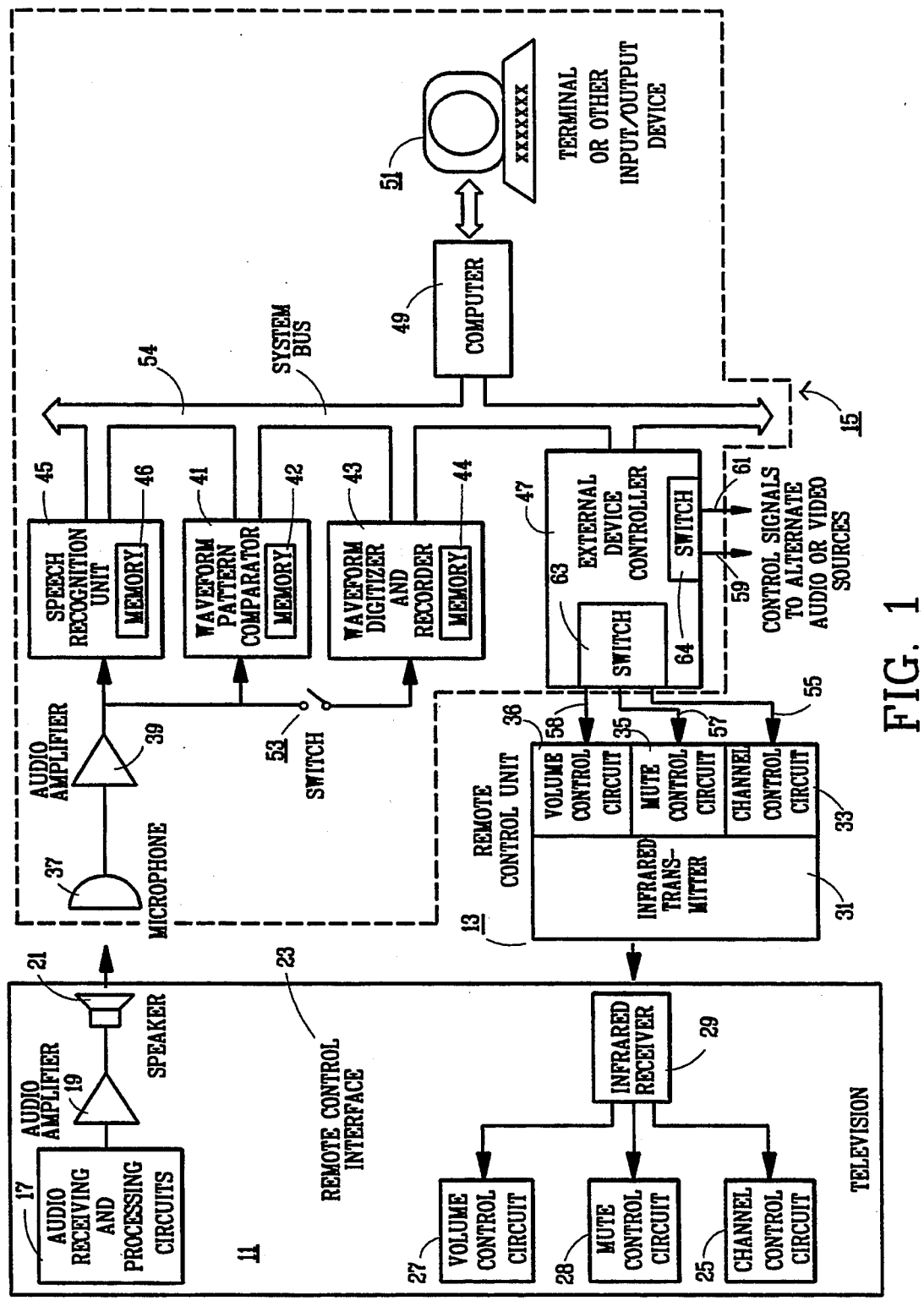
FIG. 1 is a block diagram of a television, a remote control unit for remotely controlling the operation of the television and a system constructed according to this invention for automatically controlling the audio output of the television, the system being hard wired to the remote control unit.

Referring now to the drawings there is shown in FIG. 1 a block diagram of a television 11 having a remote control capability, a remote control unit 13 for remotely controlling the operation of television 11 and a system 15 constructed according to the teachings of this invention for automatically controlling the audio output of television 11. Portions of television 11 and remote control unit 13 not pertinent to the invention are not shown and will not be discussed.

Television 11 includes audio receiving and processing circuits 17, for receiving and processing radio frequency audio signals, an audio amplifier 19 for amplifying the audio signals from audio detection circuits 17 and a speaker 21 for converting the audio signals from audio amplifier 19 into sound. Circuits 17, amplifier 19 and speaker 21 are all conventional units. Television 11 also includes a conventional remote control interface 23 which comprises a channel control circuit 25 for changing the channel, a volume control circuit 27 for controlling the volume of the sound transmitted from television 11 a mute control circuit 28 for muting the sound and then restoring it when desired and an infrared receiver 29 for receiving infrared light signls from remote control unit 13 and then transmitting electrical signals in response thereto to channel control circuit 25 or mute/-volume control circuit 27 or mute control circuit 28.

Remote control unit 13 includes an infrared transmitter 31, a channel control circuit 33, a mute control circuit 35 and a volume control circuit 36; these items all being conventional.

System 15 includes a microphone 37, an audio amplifier 39, a waveform pattern comparator 41, a waveform digitizer and recorder 43, a speech recognition unit 45, an external device controller 47, a computer 49, an input/output device 51 and a switch 53. Waveform pattern comparator 41, waveform pattern digitizer and recorder 43, speech recognition unit 45, external device controller 47 and computer 49 are all connected to a system bus 54.

Microphone 37 converts sounds received from speaker 21 in television 11 into audio signals. Audio amplifier 39 amplifies the audio signals received from microphone 37.

Waveform pattern comparator 41 includes a memory (42). Waveform pattern comparator 41 receives audio signals from audio amplifier 39, digitizes the signals, compares the digital signals to digital signals corresponding to waveform patterns previously stored in its memory and outputs an indicator signal on system bus 54 as soon as a match is detected. The duration of the indicator signal on the system bus is also stored in the memory and corresponds to the total duration of the undersired material. Alternately, the duration can be a fixed time period. Waveform digitizer and recorder 43 includes a memory 44. Waveform digitizer and recorder 43 converts audio signals corresponding to a waveform pattern which are received from audio amplifier 39 into digital signals and then stores the digital signal in its memory. These signals are then transferred to the memory in waveform pattern comparator 41 by computer 49. Input/output device 51 is used to load key words (i.e. words determined by the user to be unique in identifying undesired material) into computer 49. From computer 49 the key words (i.e. the data equivalent) are transferred to speech recognition unit 45. Speech recognition unit 45 includes a memory 46. Speech recognition unit 45 receives audio signals from audio amplifier 39 containing words, converts the audio signals into digital signals representing words contained therein, compares the digital signals to digital signals of key words previously stored in its memory and outputs an indicator signal on system bus 54 if a match is detected. The duration of the indicator signal is stored in the memory and equals the total time of the undesired material. Alternatiely, the time duration can be a fixed time period.

External device controller 47 receives an indicator signal from system bus 54 when a match is detected by either waveform pattern comparator 41 or speech recognition unit 45 and outputs control signals over lines 55 and/or 57 and 58. Control signals are also outputted over lines 59 and 61. A first manually operable selector switch 63 in controller 47 controls over which lines 55, 57 and 58 control signals are outputted and a second manually operated selector switch 64 controls over which one of lines 59 and 61 a control signal is outputted. Computer 49 controls the overall operation of system 13 and includes a memory (not shown).

Input/output device 51 inputs digital signals of words into the memory of computer 49. I/O device 51 is shown as a keyboard; however, it could be other types of devices such as a memory card or a disk drive or a microphone combined with a speech converter for entering words or patterns.

Computer 49 controls the overall operations of system 15. The operations include loading keywords inputted by input/output device 51 into speech recognition unit 45 and transferring digital signals corresponding to waveform patterns from waveform digitizer and recorder 43 to waveform pattern comparator 41.

Switch 53 is used to couple amplifier 39 to waveform digitizer and recorder 43. When switch 53 is closed, waveform digitizer and recorder puts a disable signal on bus 54. The disable signals prevent the external device controller from outputting any control signals.

In the operation of unit 15, digital signals representing key words are first loaded into the memory in the memory in speech recognition system 45 and/or digital signals corresponding to key sounds are loaded into waveform comparator 41. The key words are words unique to speech materials a user does not wish to hear. The key words may be, for example, one or more words at the beginning or as close to the beginning of a commercial or an entire commercial, the number of words depending on what is necessary to clearly identify the undesired material. The key words are entered manually using device 51. The key sounds are the sounds i.e. speech and/or music which clearly identify undesired materials. This can be, for example, music at the beginning of a song. The key sounds are obtained using waveform pattern digitizer and recorder 43 or are loaded from input/output device 51.

The length (in terms of time) of each item of undesired material or a fixed time period is also entered into the memory in computer 49 then loaded into speech recognition unit 45 or waveform pattern comparator 41 along with its associated key words or key sounds. Switches 63 and 64 are then set by the user to their respective desired position.

System 15 is then ready to automatically monitor the audio output for television 11. Anytime the previously stored undesired material is detected by either waveform pattern comparator 41 or speech recognition system 45 an indicator signal is output on the system bus 54. This indicator signal instructs controller 47 to send out a control signal to remote control unit 13 to either change the channel on television 11 or mute or lower the volume on television 11. In addition, control signals can be sent out to activate alternate audio or video sources over lines 59 and 61. After the undesired material has played or a predetermined time period loaded into the system has elapsed, speech recognition unit 45 or waveform pattern comparator 41 will remove the indicator signal that it has placed on bus 54. This will cause external device controller 47 to send out appropriate signals to return television 11 to original state and deactivate the alternate sources.

Figure 2:
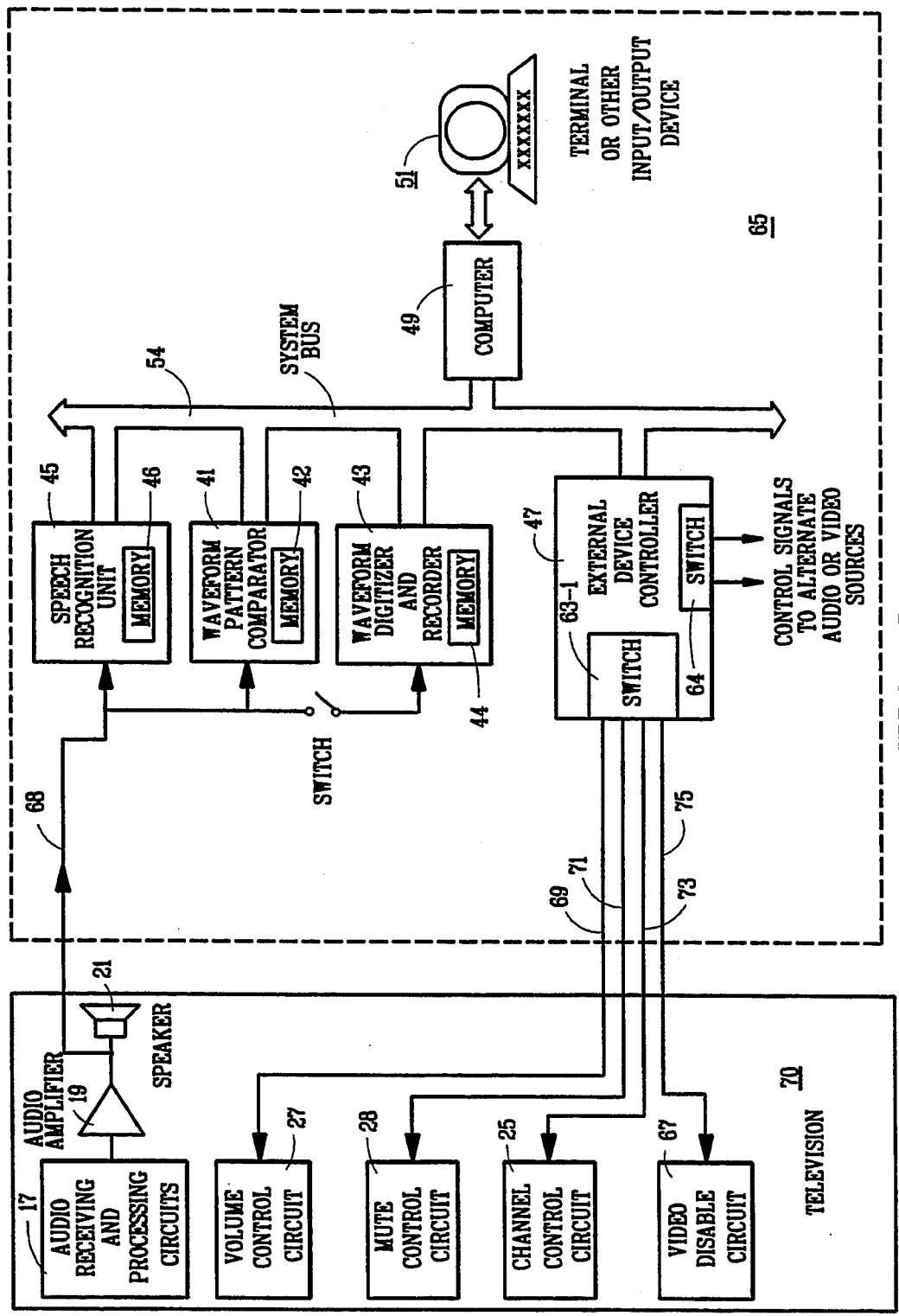
FIG. 2 is a block diagram of a television and another embodiment of a system constructed according to the teachings of the present invention for automatically controlling the audio output of the television, the system being hard wired directly to the television receiver rather than to a remote control unit.

Referring now to FIG. 2, there is shown a block diagram of a television and another embodiment of a system constructed according to this invention, the television being identified by reference numeral 70 and the system being identified by reference numeral 65. In FIG. 2, the system is directly hardwired to the television rather than to a remote control unit.

Television 70 differs from television 11 in that it also includes video disable circuits 67 for turning off the video and does not include an infrared receiver.

System 65 differs from system 15 in that it does not include a microphone 37 or an audio amplifier 39. Instead, system 65 is directly wired through line 68 to the line connecting the output of amplifier 19 to the input of speaker 21. In addition, instead of three lines connected from external controller 47 to remote control unit 13 there are four lines 69, 71, 73 and 75. The fourth line 75 being connected to video disable circuits 67. Also, switch 63 1 is a four position switch rather than a three position switch.

As can be appreciated, system 65 can also be hard wired to a television having a remote control unit which includes a video disable function circuit.

As a specific example of how the invention may be used, assume a listener does not wish to hear Lincoln's Gettsburg Address anytime it is recited over his television by John Jones. The user would first load into the system the keywords at the beginning of Lincoln's Gettysbury Address that the user feels identifies Lincoln's Gettysbury Address along with the time duration the user selects and which he feels is needed to have the entire speech presented. The key words may be the first two words such as "Four score" or the first three words or any number of words the user considers necessary to uniquely identify this item. Once loaded in, the system will silence the audio on the television or change channels any time this speech is outputted for the time duration specified.

As can also be appreciated, although the invention has been described with reference to contolling the audio output of a television, the invention is also equally applicable to controlling the audio output of other types of audio output emitting devices such as radios, tape player, CD players and so forth. When being used to control the audio output of a radio or other device that does not generate visual images, the system would obviously not need a video or channel control signal. It should also be noted that the invention is also useful with remote control televisions in which the remote control unit is hard wired to the television or coupled in any other way to the television.

The embodiments of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of automatically controlling the audio output of a television so as to avoid listening to undesired program material comprising the steps of:
   a. generating digital information corresponding to at least a portion of said undesired program material and unique to said undesired program material, then,
   b. comparing digital information corresponding to the audio output of said television with said generated digital information corresponding to said at least a portion of said undesired program material to determine the presence of said undesired program material in said audio output and generating an indicator signal as soon as said undesired program material is detected,
   c. generating a control signal in response to said indicator signal, and
   d. applying said control signal to said television to control the audio output of said television.

2. The method of claim 1 and wherein said step of generating digital information unique to said undesired program material comprises entering data corresponding to words in at least a portion of said undesired program material into a computer using an input/output device.

3. The method of claim 1 and wherein said step of generating digital information unique to said undesired program material comprises entering data corresponding to words using a keyboard.

4. A system for automatically controlling the audio output of a television so as to avoid listening to undesired program material comprising:
   a. means for generating digital information corresponding to at least a portion of said undesired program material,
   b. means for comparing said digital information corresponding to said portion of said undesired program material with digital information corresponding to said audio output and producing an indicator signal when said undesired material is detected, and
   c. means for receiving said indicator signal and producing a control signal in response thereto for controlling the audio output of said television.

5. A system for automatically controlling the audio output of a television so as to avoid listening to undesired material comprising:
   a. microphone for converting the audio output of said television into an audio signal,
   b. an audio amplifier for amplifying the audio signals signal from said microphone,
   c. a waveform pattern digitizer and recorder for digitizing and storing patterns of audio signals received from said audio amplifier corresponding to undesired material,
   d. a computer for controlling the operations of the system,
   e. an input/output device coupled to said computer for entering digital signals into said computer corresponding to key words representing said undesired material,
   f. a waveform pattern comparator, said waveform pattern comparator having a memory for receiving and storing digital signals of waveform patterns from said waveform pattern digitzer and recorder, said waveform pattern comparator receiving and digitizing the output of said audio amplifier and comparing said digitized output to the waveform patterns stored in said memory of said waveform pattern comparator and outputting an indicator signal if there is a match, and
   g. a speech recognition unit, said speech recognition unit having a memory for storing keywords, said speech recognition unit converting the audio output of the audio amplifier into data signals corresponding to speech and comparing said speech with key words stored in said memory and outputting an indicator signal if there is a match,
   h. an external device controller coupled to said waveform pattern comparator and said speech recognition system for receiving said indicator signal from either said waveform pattern comparator or said speech recognition system and generating pursuant thereto a control signal for controlling the audio output of the television.

6. A system for automatically controlling the audio output of a television so as to avoid listening to undesired material comprising:

a. means for generating digital information corresponding to a waveform pattern of said undesired material, b. means for comparing said digital information corresponding to said undesired material with digital information corresponding to a waveform pattern of said audio output and producing an indicator signal when said undesired material is detected, c. means for receiving said indicator signal and producing a control signal in response thereto for controlling the audio output of said television, and d. a computer for controlling the operations of said system.

7. A method of automatically controlling the audio output of a television so as to avoid listening to undesired material comprising the steps of:

a. generating digital information unique to said undesired material, said digital information being generated by converting waveform patterns of sound of said undesired material into data, then, b. comparing digital information corresponding to waveform patterns of the audio output of said television with said generated digital information unique to said undesired material to determine the presence of said undesired material in said audio output and generating an indicator signal as soon as said undesired material is detected, c. generating a control signal in response to said indicator signal, and d. applying said control signal to said television to control the audio output of said television.

8. A method of automatically controlling the output of a television so as to exclude undesired program material comprising the steps of:

a. generating digital information corresponding to at least a portion of said undesired program material unique to said undesired program material, then, b. comparing digital information corresponding the output of said television with said generated digital information corresponding to said at least a portion of said undesired program material to determine the presence of said undesired program material in said audio output, and then c. adjusting the output of said television when said undesirable program material is detected so as to inhibit the output of said undesired program material.

9. A system for automatically controlling the audio output of a television so as to avoid listening to undesired program material comprising:

a. a waveform digitizer and recorder for digitizing a waveform pattern corresponding to at least a portion of said undesired program material and recording said waveform pattern so digitized, b. means for comparing said digital information corresponding to said waveform pattern so recorded with digital information corresponding to a waveform pattern of said audio output and producing an indicator signal when said undesired material is detected, and c. means for receiving said indicator signal and producing a control signal in response thereto for controlling the audio output of said television.

10. A system for automatically controlling the audio output of a television so as to avoid listening to undesired program material comprising:

a. a speech recognition unit for generating digital information of words corresponding to at least a portion of said undesired program material and for controlling the operations of said system, b. means for comparing said digital information of words corresponding to said portion of said undesired program material with digital information of words corresponding to said audio output and producing an indicator signal when said undesired material is detected, and c. means for receiving said indicator signal and producing a control signal in response thereto for controlling the audio output of said television.

* * * * *

UNITED STATES PATENT AND TRADEMARK OFFICE
CERTIFICATE OF CORRECTION

PATENT NO. : 5,369,440
DATED : November 29, 1994
INVENTOR(S) : Barry Sussman

It is certified that error appears in the above-indentified patent and that said Letters Patent is hereby corrected as shown below:

On column 3, line 65, of the Patent, change "13" to --15--.
On column 4, line 15, of the Patent, change "unit" to --system--.
On column 4, line 16, of the Patent, delete "the memory in".
On column 4, line 17, of the Patent, change "system" to --unit--.
On column 4, line 18, of the Patent, insert --the memory in-- after the word "into".

In Claim 5, column 6, line 29 of the Patent, delete the word "signals".

UNITED STATES PATENT AND TRADEMARK OFFICE
CERTIFICATE OF CORRECTION

PATENT NO. : 5,369,440
DATED : November 29, 1994
INVENTOR(S) : Barry Sussman

It is certified that error appears in the above-indentified patent and that said Letters Patent is hereby corrected as shown below:

```
          column 3, lines 3-4, change "mute/volume"
to --volume--.
On page 5, column 4, line 42-43, change "system"
to --unit--.

In Claim 5, column 6, line 61, change "system"
to --unit--.
In Claim 5, column 6, line 63, change "system"
to --unit--.
```

Signed and Sealed this

Ninth Day of May, 1995

*Attest:*

BRUCE LEHMAN

*Attesting Officer*    Commissioner of Patents and Trademarks